US008072978B2

(12) United States Patent
Absillis

(10) Patent No.: US 8,072,978 B2
(45) Date of Patent: Dec. 6, 2011

(54) METHOD FOR FACILITATING APPLICATION SERVER FUNCTIONALITY AND ACCESS NODE COMPRISING SAME

(75) Inventor: Luc Absillis, Raleigh, NC (US)

(73) Assignee: Alcatel Lucent, Paris (FR)

( * ) Notice: Subject to any disclaimer, the term of this patent is extended or adjusted under 35 U.S.C. 154(b) by 925 days.

(21) Appl. No.: 11/259,863

(22) Filed: Oct. 27, 2005

(65) Prior Publication Data

US 2006/0203827 A1  Sep. 14, 2006

Related U.S. Application Data

(60) Provisional application No. 60/660,090, filed on Mar. 9, 2005.

(51) Int. Cl.
 *H04L 12/28* (2006.01)
 *H04L 12/56* (2006.01)
(52) U.S. Cl. .................................. 370/392; 370/395.54
(58) Field of Classification Search .................... 709/203
 See application file for complete search history.

(56) References Cited

U.S. PATENT DOCUMENTS

| 6,266,335 | B1 * | 7/2001 | Bhaskaran | 370/399 |
| 6,754,716 | B1 * | 6/2004 | Sharma et al. | 709/238 |
| 7,315,553 | B2 * | 1/2008 | Keller-Tuberg et al. | 370/463 |
| 2002/0010783 | A1 * | 1/2002 | Primak et al. | 709/228 |
| 2002/0154646 | A1 * | 10/2002 | Dubois et al. | 370/406 |
| 2003/0039240 | A1 * | 2/2003 | Sutanto | 370/352 |
| 2004/0032879 | A1 * | 2/2004 | Keller-Tuberg et al. | 370/465 |
| 2005/0195804 | A1 * | 9/2005 | Gautney et al. | 370/352 |
| 2006/0184349 | A1 * | 8/2006 | Goud et al. | 703/24 |

FOREIGN PATENT DOCUMENTS

EP  0 858 189 A2  8/1998

OTHER PUBLICATIONS

Melsen, et al.; MAC Forced Forwarding: An ARP Proxy Method for Ensuring Traffic Separation Between Hosts Sharing an Ethernet Access Network; IETF Internet Draft; Feb. 2004; pp. 1-12; draft-melsen-mac-forced-01.txt.

* cited by examiner

*Primary Examiner* — Gregory Sefcheck
*Assistant Examiner* — Otis L Thompson, Jr.
(74) *Attorney, Agent, or Firm* — Galasso & Associates, LP

(57) ABSTRACT

An access node comprises an application server, a logical access port coupled to the application server and a redirection filter module coupled to the logical access port. The redirection filter module includes a data redirection filter and an Address Resolution Protocol (ARP) redirection filter. The data redirection filter facilitates a data packet received on the access port being directed to the application server when a destination Media Access Control (MAC) address of the data packet corresponds to a MAC address of the application server or when a destination Internet Protocol (IP) address of the data packet corresponds to an IP address of the application server. The ARP redirection filter facilitates an ARP reply message being issued when a target IP address of an ARP request message received on the access port corresponds to the IP address of the application server.

17 Claims, 2 Drawing Sheets

METHOD FOR FACILITATING APPLICATION SERVER FUNCTIONALITY AND ACCESS NODE COMPRISING SAME

CROSS REFERENCE TO RELATED APPLICATIONS

This patent application claims priority to co-pending U.S. Provisional patent application Ser. No. 60/660,090 filed Mar. 9, 2005 entitled "Method For Exclusive Local Access To An Integrated Application Level Server In An Access Node", having a common applicant herewith and being incorporated herein in its entirety by reference.

FIELD OF THE DISCLOSURE

The disclosures made herein relate generally to communications networks and, more particularly, to methods for facilitating application server functionality in a communications network.

BACKGROUND

An application server supports support a variety of different type of functionality (i.e., server functionality). Examples of such server functionality include, but are not limited to, security and state maintenance, data access and persistence, and content catching. Such functionality is referred to herein as application server functionality. An application server is a component-based network element that resides in the middle-tier of a server centric architecture. Conventionally, with respect to an access node, an application server resides in a relatively centralized location within a communication network.

An application server needs to be IP addressable. An access node configured in a conventional manner and using a layer 2 forwarding model (e.g., intelligent cross connect, intelligent bridge, bridge, etc) cannot redirect traffic based on IP address. Hence, access nodes configured in a conventional manner cannot provide local access to an application server integrated therewith. Additionally, for an access node running an IP layer, forwarding traffic can be locally redirected but additional features need to be provided to prevent access from network ports.

A significant drawback of an application server being relatively centrally located within a communication network is associated traffic. Through client premise equipment, clients access information on a regular basis via application servers. The relatively central location of application servers contributes to traffic volume that must be supported at such relatively centralized locations within the communication network. Network resource utilization undesirably increases as traffic volume increases.

Therefore, an approach for integrating an application server into an access node overcomes drawbacks associated with relatively centralized placement of application servers, which makes such an approach useful and advantageous.

SUMMARY OF THE DISCLOSURE

Embodiments of the present invention enable application server functionality to be facilitated via an access node. More specifically, embodiments of the present invention enable application server functionality to be facilitated via an access node in a manner that is compatible with currently deployed Customer Premise Equipment (CPE) such that no new requirements on CPE need be imposed. An access node in accordance with the present invention includes an integrated application server, implements an IP layer function such that forwarding traffic can be locally redirected to the application server and includes logical features that limit access to the application server from network ports. In doing so, embodiments of the present invention advantageously overcome one or more shortcomings associated with relatively centralized placement of application servers in a network.

Application server functionality in accordance with the present invention provides for access to an application server integrated into an access node. In most cases, the application server will not offer new services but deliver existing services that today are offered by standalone servers that are more centrally located in a network. Through such integration into the access node, these services are provided in a more efficient and secure manner. For these existing services, the CPE (e.g. a home gateway router) has the capability and is configured to access these services. Moving the application server from a more centralized location in a network to the access node is essentially transparent to the CPE and requires little to no reconfiguration of or new functionality on the CPE. Accordingly, a service provider has full flexibility in offering the service with an application server relatively centrally located within a network, with an application server integrated in access node or a combination of both.

One embodiment of the present invention is a method for facilitating application server functionality in an access node comprising a plurality of operations. An operation is performed for accessing an Address Resolution Protocol (ARP) request message designating a target Internet Protocol (IP) address in response to the ARP request message being received on a logical access port of the access node. An operation is performed for issuing an ARP reply message associating the target IP address with a Media Access (MAC) address of an application server integrated within the access node in response to successful correlation of the target IP address with an IP address assigned to the application server. An operation is performed for redirecting to the application server an data packet received on the logical access port in response to a destination address of the data packet corresponding to one of an IP address and MAC address of the application server.

In another embodiment of the present invention, an access node comprises at least one data processing device, a logical access port coupled to the at least one data processing device, an application server coupled to the at least one data processing device, memory coupled to the at least one data processing device and instructions accessible from the memory and processable by the at least one data processing device. The instructions are configured for enabling the at least one data processing device to facilitate accessing an ARP request message designating a target IP address in response to the ARP request message being received on the logical access port, issuing an ARP reply message associating the target IP address with a MAC address of the application server in response to successful correlation of the target IP address with an IP address assigned to the application server and redirecting to the application server an data packet received on the logical access port in response to a destination address of the data packet corresponding to one of an IP address and MAC address of the application server.

In another embodiment of the present invention, an access node comprises an application server, a logical access port coupled to the application server and a redirection filter module coupled to the logical access port. The redirection filter module includes a data redirection filter and an ARP redirection filter.

Access nodes and methods configured in accordance with the present invention provides for a number of advantages with respect to conventional access nodes and conventional approaches to facilitating application server functionality. One advantage is that facilitating integrated application server functionality in accordance with the present invention is applicable to Layer 2 and Layer 3 forwarding models defined for access nodes. Another advantage is that such access nodes and methods are configured for being implemented in a manner compatible with CPE running a known (e.g., standard) IP stack. Still another advantage is that integrating an application server into the access node (i.e., at a peripheral region on an access network) reduces traffic volume that must traverse the access network, thereby increasing network resource utilization efficiency. Yet another advantage is that distinct network and user facing communication paths to the integrated (i.e., local) application server provides certain security and management benefits, which are discussed below in greater detail.

Turning now to specific aspects of the present invention, in at least one embodiment, issuing an ARP reply message includes determining the MAC address in response to accessing the ARP request message.

In at least one embodiment of the present invention, redirection filtering functionality for the access port is provided.

In at least one embodiment of the present invention, providing redirection filtering functionality includes specifying conditional information for a data redirection filter and specifying conditional information for an ARP redirection filter. In at least one embodiment of the present invention, specifying conditional information for a data redirection filter includes specify that a data packet received on the access port is directed to application server when a Destination MAC address of the data packet corresponds to the MAC address of the application server or when a Destination IP address of the data packet corresponds to the IP address of the application server.

In at least one embodiment of the present invention, specifying conditional information of an ARP redirection filter includes specify that an ARP reply message is issued when a target IP address of an ARP request message received on the access port corresponds to the IP address of the application server.

In at least one embodiment of the present invention, the IP address assigned to the application server is in a same IP subnet as the IP address of the client premise equipment (CPE) having access to the logical access port and the MAC address assigned to the application server is coupled to the IP address assigned to the application server.

In at least one embodiment of the present invention, an operation is provided for sending a message from the application server to an appropriate logical access port in response to the redirection filter module determining the appropriate access port.

In at least one embodiment of the present invention, determining the appropriate access port includes assessing a destination MAC address designated in the message sent from the application server.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
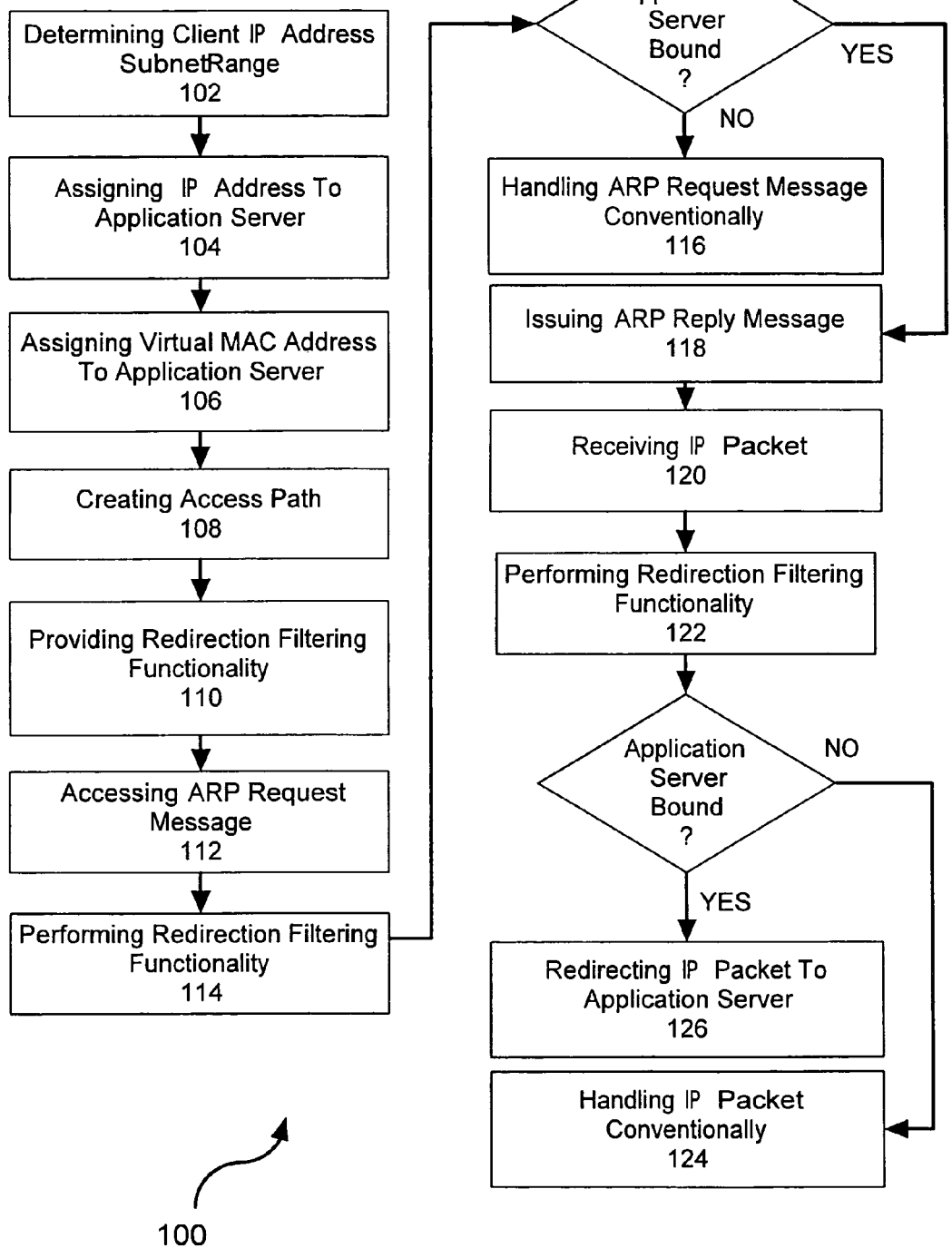
FIG. 1 depicts a method in accordance with the present invention, which is configured for facilitating application server functionality in an access node having an application server integrated therewith.

FIG. 1 depicts a method (i.e., the method 100) in accordance with the present invention, which is configured for facilitating application server functionality in an access node having an application server integrated therewith (i.e., an integrated application server). Integrating application server functionality within an access node is advantageous with respect to conventional approaches for providing application server functionality in a communications network. More specifically, such integrated application server functionality is applicable to Layer 2 and Layer 3 forwarding models defined for access nodes, is implemented in a manner compatible with CPE running a known (e.g., standard) IP stack, reduces traffic volume that must traverse the access network and provides valuable security and management benefits on network and user facing communication paths.

The method 100 begins with an operation 102 for determining an Internet Protocol (IP) address subnet range for Client Premise Equipment (CPE) that has access to a logical access port of an access node (i.e., a user-side access port). Examples of the logical access port include, but are not limited to, a logical circuit on a Digital Subscriber Line and a Passive Optical Network Interface. An operation 104 is then preformed for assigning the application server a user facing IP address (i.e., the IP address of the application server) in the same IP subnet as the IP address of the CPE, followed by an operation 106 being performed for assigning the application server a Media Access Control (MAC) address that is coupled to (e.g., matched with, assigned to, etc) the IP address assigned to the application server.

In a preferred embodiment, the application server runs on an IP protocol stack and, thus, like any other server needs to be addressable by the CPE using an IP address. The IP address is a logical address. The application server also needs to be assigned a physical address of the hardware interface. In the preferred case of connectivity being provided over an Ethernet connection, the physical address of the hardware interface that is assigned to the application server is an Ethernet MAC address (i.e., a MAC address). The MAC address can be a real (i.e., physical) MAC address of the physical Ethernet interface of the application server or a virtual MAC address chosen by an operator. The benefit of the virtual MAC address is that configuration of the redirection filter in the case where a MAC layer filter is used becomes simple and need not to be reconfigured in the event of a hardware swap for the application server.

In accordance with the present invention, the IP address of the application server needs to be in the same IP subnet as the IP addresses of the CPE directly connected to the access node that require or might require access to the application server. To limit the potential for unauthorized access to the application server via a network facing network interface, the present invention required that the user facing IP address of the application server is not used on the access port of the access node.

After the application server is assigned the IP address and the MAC address, an operation 108 is performed for creating an internal data path between the application server and the logical access port. An essential aspect of the present invention is providing this internal data path. The IP address and the MAC addresses assigned to the application server are defined herein to be unique addresses that are only visible on the internal data path. The IP address and the MAC address assigned to the application server are never used by the access node on a network link, nor will the access node respond to any messages addresses to or referring to these addresses (e.g. Address Resolution Protocol (ARP) request messages) received on a network link.

In conjunction with the application server being assigned the IP address and MAC address, an operation 110 is performed for providing redirection filtering functionality on the logical access port. Providing the redirection filtering functionality includes, but is not limited to any one of integrating a redirection filtering module (i.e., a logical redirection filtering module) with logic of logical access port and externally coupling a redirection filtering module to the logical access port. Redirection filtering functionality in accordance to the present invention is defined herein to include a data redirection filter and an ARP redirection filter. Preferably, but not necessarily, the data redirection filter is defined herein to specify that a data packet received on the access port is directed to the application server when a Destination MAC address of the data packet corresponds to the MAC address of the application server or when a Destination IP address of the data packet corresponds to the IP address of the application server. Preferably, but not necessarily, the ARP redirection filter is defined herein to specify that an ARP reply message is issued when a target IP address of an ARP request message received on the access port corresponds to the IP address of the application server. Two addresses that identically match each other is an example of addresses that correspond to each other in accordance with the present invention. Similarly, two addresses that do not exactly match each other but that suitably correspond to each (e.g., required portions of the addresses suitably correspond to each other) is an example of addresses that correspond to each other in accordance with the present invention.

It will be appreciated that the application server is an IP addressable device with an access node running in plane IP forwarding mode. Without proper provisions (e.g., redirection filtering functionality in accordance with the present invention), all devices in an attached network as well as CPE directly connected to the access node would undesirably be able to readily access the application server. Redirection filtering functionality in accordance with the present invention limits access to the application server from the network ports to authorized parties (e.g., a system administrator). It is disclosed herein that if the application server needs to be addressable from the network such as to provide a management interface or a regular communication path to network resources, the application server must be assigned an IP address in a different subnet range than the user facing addresses. This, however, does not require any specific functionality in the access node. The same mechanism or even the same addresses that are used to get access to, for example, an in-band management interface of the access node can be reused.

It is disclosed herein that, in other embodiments, providing redirection filtering functionality on the logical access port is performed prior to or after the application server is assigned the IP address and MAC address. For example, in an embodiment where actual IP and MAC addresses are not required for providing the redirection filtering functionality on the logical access port, providing redirection filtering functionality on the logical access port may be performed prior to the application server being assigned the IP address and MAC address.

After the operations for creating the internal data path and providing the redirection filtering functionality are provided, an operation 112 is performed for accessing an ARP request message received on the logical access port. Intercepting the ARP request message as it is flowing across the internal data path is an embodiment of accessing the ARP request message. Once the ARP request message is accessed, an operation 114 is performed for performing redirection filtering functionality on the ARP request message, which entails determining whether a target IP address of the ARP request message corresponds to the IP address of the application server. If the target IP address of the ARP request message does not correspond to the IP address of the application server, an operation 116 is performed for handling the ARP request message in a known conventional manner. Otherwise, an operation 118 is performed by the redirection filtering functionality for issuing an ARP reply message to the CPE that sent the ARP request message. The ARP reply message resolves (i.e., associates) the IP address of the application server to the MAC address of the application server.

In response to receiving the ARP reply message, the CPE is able to issue data packets with a destination address of the application server in the case where the intent is for the data packet to be received by the application server. Accordingly, thereafter, an operation 120 is performed for receiving an IP packet (i.e., a data packet) on the access port of the logical access port. After the IP data packet is received, an operation 122 is performed for performing redirection filtering functionality on the IP packet, which entails determining whether a Destination MAC address of the IP packet corresponds to the MAC address of the application server or whether a Destination IP address of the IP packet corresponds to the IP address of the application server. If the Destination MAC address of the IP packet does not correspond to the MAC address of the application server or if the Destination IP address of the IP packet does not correspond to the IP address of the application server, an operation 124 is performed for handling the IP packet in a known conventional manner. Otherwise, an operation 126 is performed by the redirection filtering functionality for redirecting the IP packet to the application server via the internal data path created between the logical access port and the application server.

Figure 2:
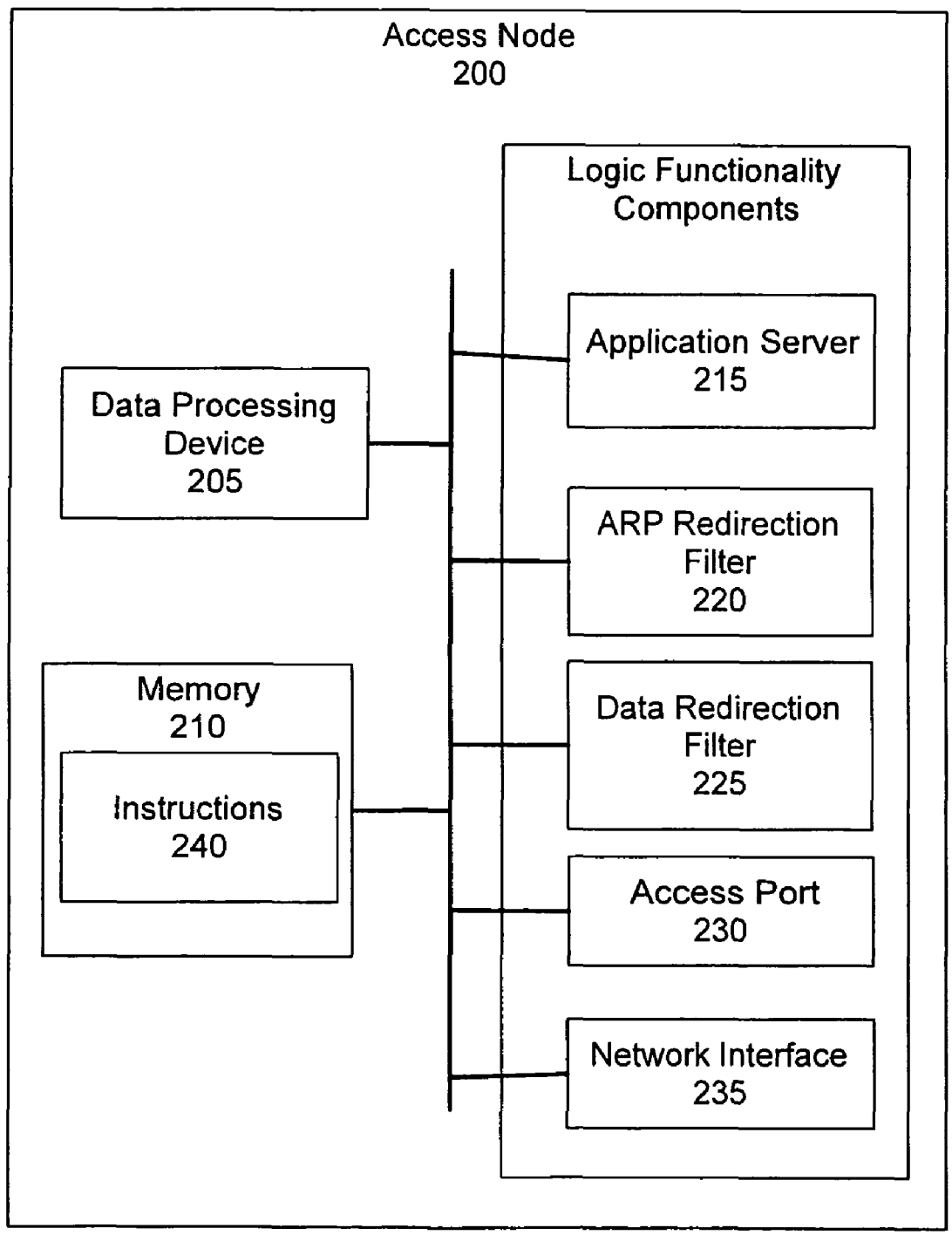
FIG. 2 depicts an embodiment of an access node in accordance with the present invention, which is suitably configured for carrying out the method depicted in FIG. 1.

FIG. 2 depicts an embodiment of an access node in accordance with the present invention, which is referred to herein as the access node 200. As will be discussed in greater detail below, the access node 200 is configured for carrying out application server functionality in accordance with the present invention. For example, the access node 200 is suitably configured for enabling the method 100 discussed above in reference to FIG. 1 to be carried out.

The access node 200 includes a data processing device 205, memory 210, an application server 215, an ARP redirection filter 220, a data redirection filter 225, a user-facing access port 230 (i.e., the access port 230) and a network-facing network interface 235 (i.e., the network interface 235). Together, the ARP redirection filter 220 and the data redirection filter 225 are an embodiment of a redirection filtering module in accordance with the present invention. The data processing device 205, the memory 210, the application server 215, the ARP redirection filter 220, the data redirection filter 225, the access port 230 and the network interface 235 are interconnected for enabling interaction therebetween. The application server 215, the ARP redirection filter 220, the data redirection filter 225, the access port 230 and the network interface 235 are logic functionality components that provide respective functionality in view of operations carried out by the access node (e.g., in accordance with the method 100).

In the depicted embodiment, the logic functionality components each utilize processing resources of the data processing device 205. Residing in the memory 210 is instructions 240 for, among other functionality, carrying out application server functionality in accordance with the present invention. More specifically, the instructions 240 are configured for carrying out functionality associated with the application server 215, the ARP redirection filter 220, the data redirection filter 225, the access port 230 and the network interface 235. The instructions 240 are accessible from within the memory 210 and are processable by the data processing device 205. Broadly, the instructions 230 are configured for enabling the data processing device 205 to facilitate the operations of accessing an ARP request message designating a target IP address in response to the ARP request message being received on a logical access port of the access node, issuing an ARP reply message associating the target IP address with a MAC address of an application server integrated within the access node in response to successful correlation of the target IP address with an IP address assigned to the application server and redirecting to the application server an data packet received on the logical access port in response to a destination address of the data packet corresponding to one of an IP address and MAC address of the application server.

An access node in accordance with the present invention has an application server integrated therewith. Thus, an application server in accordance with the present invention provides server functionality (i.e., logic) that runs on hardware integrated in the access node. For example, the application server may be implemented via server software running on existing processing resources in the access node, server software running on dedicated processing hardware physically integrated in the access node (e.g., a blade that slides in one of the slots in the access node, a daughter card on one of the existing bladed, etc) and/or server software running on physically separate hardware directly attached to the access node that is logically integrated. In the context of the present invention, logically integrated means that equipment management of a separate box is handled by the access node, that combined hardware is presented as a single network node to management systems and that a connection link between access node and the separate hardware is treated as a box internal interface and not a external open interface.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating application server functionality in an access node; comprising:
    accessing an Address Resolution Protocol (ARP) request message designating a target Internet Protocol (IP) address in response to the ARP request message being received on a logical access port of the access node wherein the access node is located at the edge of a network and comprises a point of end user access to the network;
    issuing an ARP reply message associating the target IP address with a Media Access (MAC) address of an application server integrated within the access node in response to successful correlation of the target IP address with an IP address assigned to the application server; and
    redirecting to the application server a data packet received on the logical access port in response to a destination address of the data packet corresponding to one of an IP address and MAC address of the application server wherein the application server is separately addressable within the access node and there is an internal data path from the logical access port to the application server located within the access node and wherein the IP address and the MAC address of the application server are unique addresses that are only visible on the internal data path; and
    providing redirection filtering functionality for the access port, wherein said providing redirection filtering functionality includes specifying conditional information for a data redirection filter and specifying conditional information for an ARP redirection filter and when the application server is addressable from the network, the application server is assigned an IP address in a different subnet range than the user facing addresses.

2. The method of claim 1 wherein said issuing includes determining the MAC address in response to accessing the ARP request message and wherein the application server supports a variety of different types of functionality including security and state maintenance, data access and persistence, and content caching.

3. The method of claim 1, wherein:
    said specifying conditional information for the data redirection filter includes specifying that a data packet received on the access port is directed to the application server when a Destination MAC address of the data packet corresponds to the MAC address of the application server or when a Destination IP address of the data packet corresponds to the IP address of the application server; and
    said specifying conditional information of the ARP redirection filter includes specifying that an ARP reply message is issued when a target IP address of an ARP request message received on the access port corresponds to the IP address of the application server.

4. The method of claim 3, further comprising:
    assigning the MAC address of the application server, wherein the MAC address of the application server is coupled to the IP address assigned to the application server.

5. The method of claim 1, further comprising:
    assigning the IP address of the application server to the application server;
    assigning the MAC address of the application server, wherein the MAC address of the application server is coupled to the IP address assigned to the application server; and
    providing redirection filtering functionality on the logical access port prior to the application server being assigned the IP address and MAC address.

6. The method of claim 5, further comprising:
    sending a message from the application server to an appropriate logical access port in response to a redirection filter module determining the appropriate access port.

7. The method of claim 6 wherein said determining includes assessing a destination MAC address designated in the message sent from the application server.

8. An access node, comprising:
- at least one data processing device;
- a logical access port coupled to said at least one data processing device;
- an application server coupled to said at least one data processing device;
- memory coupled to said at least one data processing device; and
- instructions accessible from said memory and processable by said at least one data processing device, wherein said instructions are configured for enabling said at least one data processing device to facilitate:
  - accessing an Address Resolution Protocol (ARP) request message designating a target Internet Protocol (IP) address in response to the ARP request message being received on the logical access port of the access node wherein the access node is located at the edge of a network and comprises a point of end user access to the network;
  - issuing an ARP reply message associating the target IP address with a Media Access (MAC) address of the application server in response to successful correlation of the target IP address with an IP address assigned to the application server; and
  - redirecting to the application server a data packet received on the logical access port in response to a destination address of the data packet corresponding to one of an IP address and MAC address of the application server wherein the application server is separately addressable within the access node and there is an internal data path from the logical access port to the application server located within the access node and wherein the IP address and the MAC address of the application server are unique addresses that are only visible on the internal data path; and
  - providing redirection filtering functionality for the logical access port, wherein said providing redirection filtering functionality includes specifying conditional information for a data redirection filter and specifying conditional information for an ARP redirection filter and when the application server is addressable from the network, the application server is assigned an IP address in a different subnet range than the user facing addresses.

9. The access node of claim 8 wherein said issuing includes determining the MAC address in response to accessing the ARP request message.

10. The access node of claim 8, wherein:
- said specifying conditional information for the data redirection filter includes specifying that a data packet received on the access port is directed to the application server when a Destination MAC address of the data packet corresponds to the MAC address of the application server or when a Destination IP address of the data packet corresponds to the IP address of the application server; and
- said specifying conditional information of the ARP redirection filter includes specifying that an ARP reply message is issued when a target IP address of an ARP request message received on the access port corresponds to the IP address of the application server.

11. The access node of claim 10 wherein said instructions are further configured for enabling said at least one data processing device to facilitate:
- assigning the MAC address of the application server, wherein the MAC address of the application server is coupled to the IP address assigned to the application server.

12. The access node of claim 8 wherein said instructions are further configured for enabling said at least one data processing device to facilitate:
- assigning the IP address of the application server to the application server; and
- assigning the MAC address of the application server, wherein the MAC address of the application server is coupled to the IP address assigned to the application server.

13. The access node of claim 12 wherein said instructions are further configured for enabling said at least one data processing device to facilitate:
- sending a message from the application server to an appropriate logical access port in response to a redirection filter module determining the appropriate access port.

14. The access node of claim 13 wherein said determining includes assessing a destination MAC address designated in the message sent from the application server.

15. An access node, comprising:
- an application server;
- a logical access port coupled to the application server;
- and a redirection filter module coupled to the logical access port, wherein the redirection filter module includes a data redirection filter and an Address Resolution Protocol (ARP) redirection filter wherein the application server is separately addressable within the access node and wherein the access node is located at the edge of a network and comprises a point of end user access to the network and there is an internal data path from the logical access port to the application server located within the access node and wherein the redirection filter module provides redirection filtering functionality for the access port, wherein said providing redirection filtering functionality includes specifying conditional information for the data redirection filter and specifying conditional information for the ARP redirection filter and when the application server is addressable from the network, the application server is assigned an IP address in a different subnet range than the user facing addresses.

16. The access node of claim 15 wherein:
- the data redirection filter facilitates a data packet received on the access port being directed to the application server when a destination Media Access Control (MAC) address of the data packet corresponds to a MAC address of the application server or when a destination Internet Protocol (IP) address of the data packet corresponds to an IP address of the application server; and
- the ARP redirection filter facilitates an ARP reply message being issued when a target IP address of an ARP request message received on the access port corresponds to the IP address of the application server and wherein the IP address and the MAC address of the application server are unique addresses that are only visible on the internal data path.

17. The access node of claim 16 wherein:
- the MAC address of the application server is coupled to the IP address assigned to the application server.

* * * * *